Dec. 16, 1924.

T. R. REED

CHAIN FASTENER

Filed April 14, 1924

1,519,469

Inventor
T. R. Reed
By Clarence A. O'Brien
Attorney

Patented Dec. 16, 1924.

1,519,469

UNITED STATES PATENT OFFICE.

THEODORE R. REED, OF HAMPTON, NEBRASKA.

CHAIN FASTENER.

Application filed April 14, 1924. Serial No. 706,477.

*To all whom it may concern:*

Be it known that I, THEODORE R. REED, a citizen of the United States, residing at Hampton, in the county of Hamilton and State of Nebraska, have invented certain new and useful Improvements in a Chain Fastener, of which the following is a specification.

This invention relates to new and useful improvements in chain fasteners and is principally adapted for use in connection with the anti-skid chain adapted to extend around the tire of a wheel.

One of the important objects of the present invention is to provide a chain fastener for fastening the ends of the circumferentially extending chain on a tire wherein means is provided for preventing the accidental opening of the fastener so as to cause disengagement of the free ends of the circumferentially extending chain therefrom.

A still further object of the present invention is to provide a tire chain fastener of the above mentioned character, wherein a casing is associated with the hook comprising the fastener, locking means being associated with the hook and casing to automatically lock the casing on the hook when the casing is disposed over the hook, the parts being further so arranged as to facilitate the ready opening of the fastener whenever desired.

A still further object of the invention is to provide a tire chain fastener of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1:
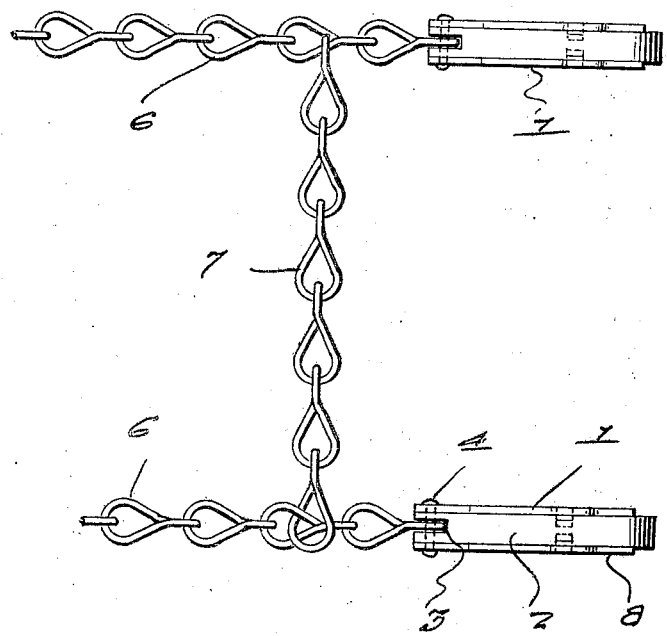
Figure 1 is a bottom plan view of a portion of an anti skid chain showing my chain fastener secured to the ends of the circumferentially extending chain.

In the drawing wherein for the purpose of illustration is shown the preferred embodiment of my invention, the numeral 1 designates generally my chain fastener and the same comprises the hook 2, the rear portion of which is bifurcated as shown at 3 and through which extends transversely the pin 4. The forward end of the hook 2 is provided with the chain receiving notch 5 in the manner well known in the art. One end of each of the circumferentially extending chains 6 is adapted to be secured between the bifurcated rear end of the hook 2 on the transversely extending pin 4 in the manner clearly illustrated in Figure 1 of the drawing. As there are two chains provided it is of course to be understood that there will also be two chain fasteners associated therewith. However, as the construction of the chain fasteners are identical, the description of one is thought to suffice for the description of both. The opposite ends of the circumferentially extending chains 6 which extend around the sides of the automobile tire in the usual manner are engaged in the notches 5 in the usual manner. The usual cross chain 7 is connected at its respective ends to the parallel spaced circumferentially extending chains 6 in the usual manner and any number of these cross chains may be provided as is necessary.

For the purpose of retaining the free ends of the circumferential chains 6 in the forward ends of the hooks 2, I provide each hook with a casing such as is shown at 8. The casing is open at its bottom and at its ends and is pivotally supported on the transverse pin 4 and the sides of the casing extend on the outer sides of the hook in the manner as clearly illustrated in the drawing. The casing is further of such a construction as to extend over the forward end of the hook in the manner illustrated in Figure 2 of the drawing.

For the purpose of locking the casing on the hook 2 so as to prevent the accidental disengagement of the free ends of the chains 6 therefrom, I provide a pair of spring latches such as are shown at 9 in the drawing. Each latch is secured at its lower end to the sides of the hook 2 as shown at 10 in the drawing, and the latches are preferably arranged so as to extend upwardly along the sides of the hook at the intermediate portion thereof. The sides of the hook where the latches are secured are cut away as shown at 11 and the cut away portions or channels 11 converge toward the upper edge of the hook in the manner clearly illustrated in Figure 3. The upper ends of the spring latches 9 are disposed outwardly as shown at 12 and are adapted to be normally received in suitable openings 13 provided in the sides of the casing 8 in the manner as illustrated in Figures 2 and 3.

Figure 3:
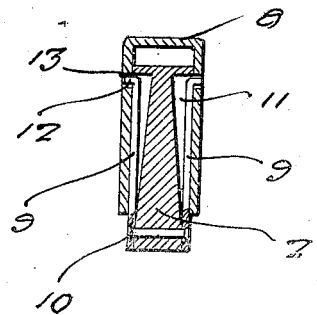
Figure 3 is an enlarged vertical sectional view taken approximately on line 3—3 of Figure 2.
Figure 2:
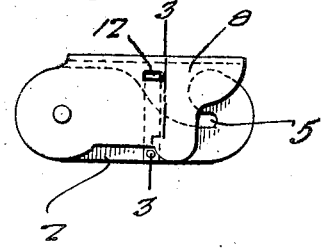
Figure 2 is a side elevation of my improved chain fastener.

When the parts are arranged as shown in Figures 2 and 3 of the drawing, the casing 8 will be locked on the hook 2 and will be prevented from accidentally being opened, thus holding the free ends of the circumferentially extending chain 6 in the notched portions of the hooks 2. When it is desired to release the free ends of the chains from the forward ends of the hooks, the outwardly extending portions 13 of the upper ends of the latches 9 are moved inwardly within the channels 11 so as to cause the same to be disengaged from the openings 13 formed in the sides of the casing. The casing may then be swung on the pivot pin 4 so as to permit the free ends of the chains to be removed from the notched portions of the forward ends of the hooks in a simple and efficient manner.

A tire chain fastener of the above mentioned character, may be manufactured at a very low cost and will further be strong and durable. The provision of a spring locking means in the manner heretofore set forth provides a means for preventing the accidental opening of the tire fastener and will insure the securing of the free ends of the chain in the chain fastener.

While I have shown the preferred embodiment of my invention, it is to be understood that various changes in the size, shape and arrangement of parts may be resorted to without departing from the spirit of the invention and the scope of the appended claims.

Having thus described my invention, what I claim is:—

1. A chain fastener of the class described comprising a hook, a casing therefor pivoted on said hook, means for locking said casing on said hook comprising a pair of spring latches secured at their lower ends to the opposite sides of said hook, said hook being provided with vertical channels for receiving said spring latches, the upper ends of the spring latches being disposed outwardly and receivable in openings provided in the sides of said casing.

2. A chain fastener of the class described comprising a hook, a casing therefor pivoted thereon, means for locking said casing on said hook comprising a pair of spring latches secured at their lower ends to the opposite sides of said hooks on the intermediate portion thereof, said hook having its sides provided with converging channels arranged vertically therein and adapted to receive said spring latches, the upper ends of said spring latches being disposed outwardly and receivable in openings provided in the sides of said casing.

In testimony whereof I affix my signature.

THEODORE R. REED.